United States Patent
Song (10) Patent No.: US 12,363,600 B2
(45) Date of Patent: Jul. 15, 2025

(54) CELL SELECTION PRIORITY

(71) Applicant: T-MOBILE INNOVATIONS LLC, Overland Park, KS (US)

(72) Inventor: Minho Song, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 537 days.

(21) Appl. No.: 17/724,185

(22) Filed: Apr. 19, 2022

(65) Prior Publication Data
US 2023/0337083 A1 Oct. 19, 2023

(51) Int. Cl.
*H04W 36/04* (2009.01)
*H04W 36/00* (2009.01)
*H04W 36/30* (2009.01)
*H04W 48/12* (2009.01)
*H04W 72/044* (2023.01)

(52) U.S. Cl.
CPC ....... *H04W 36/04* (2013.01); *H04W 36/0066* (2013.01); *H04W 36/30* (2013.01); *H04W 48/12* (2013.01); *H04W 72/0473* (2013.01)

(58) Field of Classification Search
CPC . H04W 36/04; H04W 36/0066; H04W 36/30; H04W 48/12; H04W 72/0473; H04W 48/20
See application file for complete search history.

(56) References Cited

U.S. PATENT DOCUMENTS

| | | | |
|---|---|---|---|
| 2010/0216475 A1* | 8/2010 | Hoole | H04W 36/302 455/436 |
| 2012/0122448 A1* | 5/2012 | Mueck | H04W 28/24 455/424 |
| 2013/0034081 A1* | 2/2013 | Ban | H04W 36/16 370/331 |
| 2015/0024756 A1* | 1/2015 | Du | H04W 28/0226 455/437 |
| 2016/0073318 A1* | 3/2016 | Aguirre | H04W 36/324 455/436 |
| 2016/0192261 A1* | 6/2016 | Wang | H04W 36/16 370/331 |
| 2017/0188311 A1* | 6/2017 | Hwang | H04W 52/34 |
| 2017/0311217 A1* | 10/2017 | Jung | H04W 48/08 |
| 2020/0008127 A1* | 1/2020 | Ohtsuji | H04W 4/70 |
| 2021/0105788 A1* | 4/2021 | Kim | H04L 41/0869 |
| 2023/0269614 A1* | 8/2023 | Chen | H04W 24/08 370/252 |

* cited by examiner

*Primary Examiner* — Christine Ng
(74) *Attorney, Agent, or Firm* — Shook, Hardy & Bacon L.L.P.

(57) ABSTRACT

Methods, media, and systems are provided for controlling cell site selection by a user device in a telecommunications network. A System Information Block (SIB) message (e.g., an SIB Type 1 message) is transmitted (e.g., by a cell site) for receipt by the user device for cell site selection. In some aspects, the SIB message is transmitted while the user device is camping on a serving cell of a base station other than the cell site. The SIB message comprises information that identifies a type of the cell site. The type of the cell site is a cell site other than a macro cell, such as a small cell for example. Upon selection of the cell site by the user device based on the SIB message and the type of the cell site, the user device is provided access to a telecommunications service.

20 Claims, 7 Drawing Sheets

```
BCCH-DL-SCH-Message
    systemInformationBlockType1
        systemInformationBlockType1 [ 0 ] BCCH-DL-SCH-Message =
            message = c1 = systemInformationBlockType1 =
                cellAccessRelatedInfo =
                    plmn-IdentityList = SEQUENCE OF PLMN-IdentifyInfo
                        PLMN-IdentifyInfo(1) =
                            plmn-Identity =
                                mcc = SEQUENCE OF MCC-MNC-Digit
                                    MCC-MNC-Digit(1) = 0
                                    MCC-MNC-Digit(2) = 0
                                    MCC-MNC-Digit(3) = 1
                                mnc = SEQUENCE OF MCC-MNC-Digit
                                    MCC-MNC-Digit(1) = 0
                                    MCC-MNC-Digit(2) = 1
                            cellReservedForOperatorUse = notReserved
                    trackingAreaCode = 0000000000000001
                    cellIdentity = 000000000000000000100000000
                    cellBarred = notBarred
                    intraFreqReselection = notAllowed
                    csg-Indication = FALSE
                cellSelectionInfo =
                    q-RxLevMin = -53
                freqBandIndicator = 7
                schedulingInfoList = SEQUENCE OF SchedulingInfo
                    SchedulingInfo (1) =
                        si-Periodicity = rf16
                        sib-MappingInfo = SEQUENCE OF
                    SchedulingInfo (2) =
                        si-Periodicity = rf32
                        sib-MappingInfo = SEQUENCE OF SIB-Type
                            SIB-Type (1) = sibType3
                si-WindowLength = ms20
                systemInfoValueTag = 0
```

CELL SELECTION PRIORITY

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for controlling cell site selection by a user device in a network for telecommunications services, substantially as shown in and/or described in connection with at least one of the figures, and as set forth more completely in the claims.

In aspects set forth herein, and at a high level, the systems and methods disclosed herein provide for cell site selection based at least in part on a type of the cell site. For example, one or more System Information Block Type 1 (SIB1) messages are transmitted for receipt by the user device for cell site selection. In some embodiments, each SIB1 message comprises information that identifies a type of the cell site (e.g., a small cell). In some embodiments, an SIB 1 message comprises information that identifies the type of a neighboring cell site as a macro cell. Upon selection or reselection, by the user device, of the cell site over the neighboring cell site based on the information identifying the type of the cell site or the type of the neighboring cell site (or a combination thereof), the user device is provided access to a telecommunications service via the cell site.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
3GPP Third-Generation Partnership Project
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
LTE Long Term Evolution
MIMO Multiple Input Multiple Output
NR New Radio
PC Personal Computer
PDA Personal Digital Assistant
PLMN Public Land Mobile Network
RAM Random Access Memory
RF Radio-Frequency
ROM Read Only Memory
RRU Remote Radio Unit
RSRP Reference Transmission Receive Power
RSRQ Reference Transmission Receive Quality
SIB System Information Block
SIB1 System Information Block Type 1
SIB2 System Information Block Type 2
TDMA Time Division Multiple Access In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof, combinations thereof, combinations, any combination, some combinations) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 202, 204, and 206, described herein with respect to FIG. 2. A user device may also be, in another embodiment, similar to user device 700, described herein with respect to FIG. 7.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or combinations thereof. Internet-of-things devices may be stationary, mobile, or both. In some aspects, the user device is associated with a vehicle (e.g., a video system in a car capable of receiving media content stored by a media device in a house when coupled to the media device via a local area network. In some aspects, the user device comprises a medical device, a location monitor, a clock, other wireless communication devices, or combinations thereof.

In aspects, a user device discussed herein may be configured to communicate using one or more of 4G (e.g., LTE), 5G, 6G, another generation communication system, or a combination thereof. In some aspects, the user device has a radio that connects with a 4G cell site but is not capable of connecting with a higher generation communication system. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

Further, the term "coverage area," as used herein, refers to a geographical area wherein a network provides wireless telecommunications services (e.g., the transfer of information without the use of an electrical conductor as the transferring medium). Wireless telecommunications services may include, but are not limited to, the transfer of information via radio waves (e.g., Bluetooth®), satellite communication, infrared communication, microwave communication, Wi-Fi, millimeter wave communication, and mobile communication. Embodiments of the present technology may be used with different wireless telecommunication technologies or standards, including, but not limited to, CDMA 1×Advanced, GPRS, Ev-DO, TDMA, GSM, WiMax technology, LTE, LTE Advanced, other technologies and standards, or a combination thereof.

The network providing the wireless telecommunications services may be a telecommunications network(s), or a portion thereof. A telecommunications network might include an array of devices or components (e.g., one or more cell sites). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides voice, message (e.g., SMS messages, MMS messages, instant messaging messages, EMS messages), or data services to user devices or corresponding users that are registered or subscribed to utilize the services provided by a telecommunications provider. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, and any combination thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNB s, relay cell sites, or other network components. The network may interface with one or more cell sites through one or more wired or wireless backhauls. As such, the one or more cell sites may communicate via the network or directly. Furthermore, user devices can utilize the network to communicate with other devices (e.g., a user device(s), a server(s), etc.) through the one or more cell sites.

As used herein, the term "cell site" (used for providing UEs with access to the telecommunications services) generally refers to one or more cellular base stations, nodes, RRUs control components, and the like (configured to provide a wireless interface between a wired network and a wirelessly connected user device). A cell site may comprise one or more nodes (e.g., eNB, gNB, and the like) that are configured to communicate with user devices. In some aspects, the cell site may include one or more band pass filters, radios, antenna arrays, power amplifiers, transmitters/receivers, digital signal processors, control electronics, GPS equipment, and the like. An eNB or gNB corresponding to the cell site may comprise one or more of a macro base station, a small cell or femtocell base station, a relay base station, a combination thereof, and so forth. In aspects, the cell site may be configured as FD-MIMO, massive MIMO, MU-MIMO, cooperative MIMO, 3G, 4G, 5G, another generation communication system, or 802.11. In addition, the cell site may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional techniques for mode selection and cell selection or reselection procedures in wireless communications systems include user device selection or reselection of a cell that the user device is to be camped on. In conventional cell selection techniques, a base station sends an NR frequency list to the user device. The NR frequency list includes a list of frequencies used and supported by the cell corresponding to the base station. Some conventional systems do not send the NR frequency list in an SIB (e.g., SIB1 or SIB2). In addition, some conventional cell selection techniques involve a user device selecting a cell solely based on downlink channel quality. In conventional 3GPP technologies (e.g., LTE), a cell is selected by user devices using solely measured values of signal strength such as RSRP and RSRQ.

As a result of these conventional cell selection and reselection techniques, cell sites that are smaller than macro cells (e.g., small cells, picocells, microcells, femtocells, etc.) are underutilized. For example, the high radio frequency power of the macro cell dominates overlapping coverage areas provided by cell sites smaller than the macro cell. Because conventional cell selection and reselection techniques are based solely on the NR frequency list provided in an SIB, solely on the downlink channel quality, or solely on the RSRP and RSRQ measured values, user devices select and reselect the macro cell over other cell sites smaller than the macro cell. This results in underutilization of the other cell sites smaller than the macro cell, which are useful for cell selection and reselection by the user device in areas of macro cell high traffic and for offloading traffic from the macro cell.

Due to desirable increased data rates, demand for mobile broadband access, demand for higher capacity, and demand for higher system reliability, new approaches or methods for cell selection or reselection are desirable for improving user device mobility and enhancing telecommunications services among telecommunications networks to satisfy consumer demand and to improve user experience in wireless communications. For example, the failure of conventional cell selection and reselection techniques to consider other factors for cell selection and reselection, such as the failure to consider a type of the cell site, results in reduced coverage balancing, increased interferences from various carriers or component carriers associated with the corresponding cell site or other neighboring cell sites, reduced frequency-diversity, reduced data throughput, reduced bandwidth availability, and reduced air-interface capacity.

To improve these deficiencies, new approaches or methods are desirable for cell selection or reselection that result in improved coverage balancing, improved frequency-diversity, improved bandwidth availability, and reduced interferences. For example, the conventional techniques, in addition to the failure to consider cell site type, also fail to provide information to user devices that includes the type of the cell site providing the coverage area. As such, the systems and methods provided herein can alleviate the problems discussed above by providing information to the user devices that includes the cell site type, thus allowing the user device to select or reselect a cell site based on the cell site type.

For instance, in aspects, the systems and methods disclosed herein result in more efficient utilization of cell sites that are smaller than macro cells, improved coverage balancing, decreased interference, improved frequency-diversity, improved data throughput, improved bandwidth availability, and improved air-interface capacity. In one aspect, a system is provided for controlling cell site selection by a user device in a network for a telecommunications service. The system may comprise one or more antenna elements, associated with a cell site other than a macro cell, that support a telecommunications service for the user device. The system also comprises one or more processors configured to execute operations. The operations comprise transmitting an SIB1 for receipt by the user device for cell site selection, the SIB1 transmission comprising information identifying a type of the cell site other than the macro cell. The operations also comprise providing, upon selection of the cell site by the user device based on the SIB1 transmission comprising the information identifying the type of the cell site, access to the telecommunications service for the user device.

In another aspect, a method is provided for controlling cell site selection by a user device in a network for a telecommunications service. The method comprises receiving, by the user device, a first SIB1 transmission associated with a first cell site, the first SIB1 transmission comprising information identifying a first type of the first cell site. Additionally, the method comprises receiving, by the user device, a second SIB1 transmission associated with a second cell site, the second SIB1 transmission comprising information identifying a second type of the second cell site, the second cell site providing a smaller coverage area than the first cell site. The method also comprises comparing, by the user device, the information identifying the first type of the first cell site and the information identifying the second type of the second cell site. Based on comparing the information identifying the first type of the first cell site and the information identifying the second type of the second cell site, the user device selects the second cell site as a serving cell site for the user device.

In yet another aspect, non-transitory computer-readable storage media are provided, the media having computer-executable instructions embodied thereon that, when executed by one or more processors, cause the one or more processors to perform operations. For example, the operations include causing the transmission of a first SIB message for receipt by the user device for cell site selection, the first SIB message comprising information identifying a first type of a first cell site. Additionally, the operations comprise causing the transmission of a second SIB message for receipt by the user device for cell site selection, the second SIB message comprising information identifying a second type of a second cell site, the second cell site providing a smaller coverage area than the first cell site. Further, the operations comprise causing the second cell site to provide, upon selection of the second cell site by the user device based on the first SIB message and the second SIB message, access to the telecommunications service for the user device.

Figure 1:
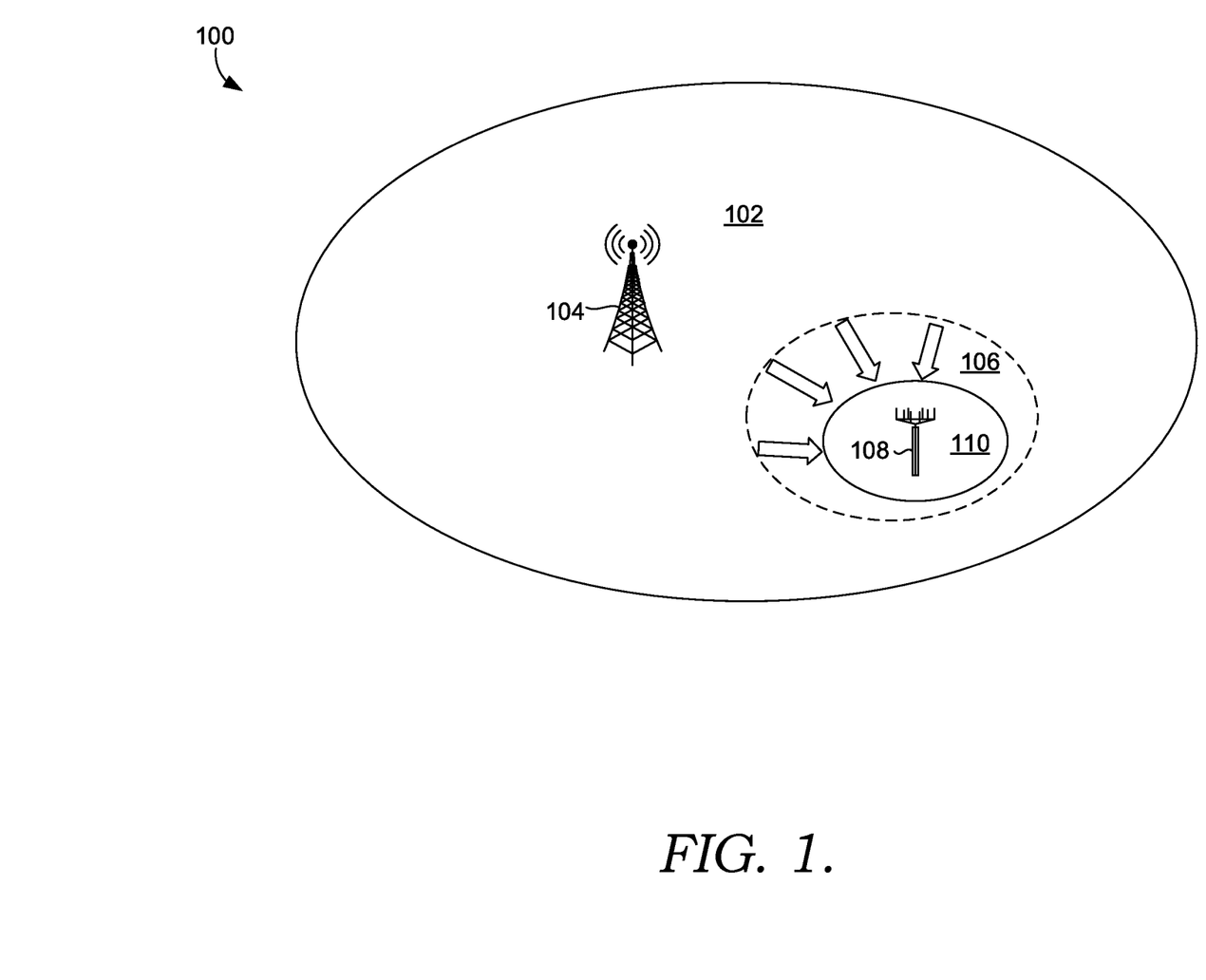
FIG. 1 depicts an example environment illustrating a dominance effect of a macro cell, in accordance with aspects herein.

Turning now to FIG. 1, example environment 100 depicts a dominance effect of a macro cell. Example environment 100 comprises a first coverage area 102 provided by a first cell site 104, a second coverage area 106 provided by a second cell site 108, and a reduced coverage area 110 of the second cell site 108. In aspects, the first cell site 104 is a macro cell and the second cell site 108 is a small cell, a femtocell, a picocell, a microcell, or another type of cell site having an antenna structure that provides a coverage area that is smaller or narrower than the macro cell.

As a result of the high radio frequency power of the first cell site 104, in example environment 100, the first coverage area 102 dominates in its coverage surrounding the second coverage area 106. In example environment 100, the radio frequency power of the second cell site 108 is lower than the radio frequency power of the first cell site 104. As such, the second coverage area 106 provided by the second cell site 108 is condensed to the reduced coverage area 110. As such, conventional techniques for cell selection or reselection procedures result in UEs within the second coverage area 106 and the reduced coverage area 110 selecting the first cell site 104 over the second cell site 108, such that the second cell site 108 is underutilized and such that the second cell site 108 does not offload traffic from the first cell site 104.

Figure 2:
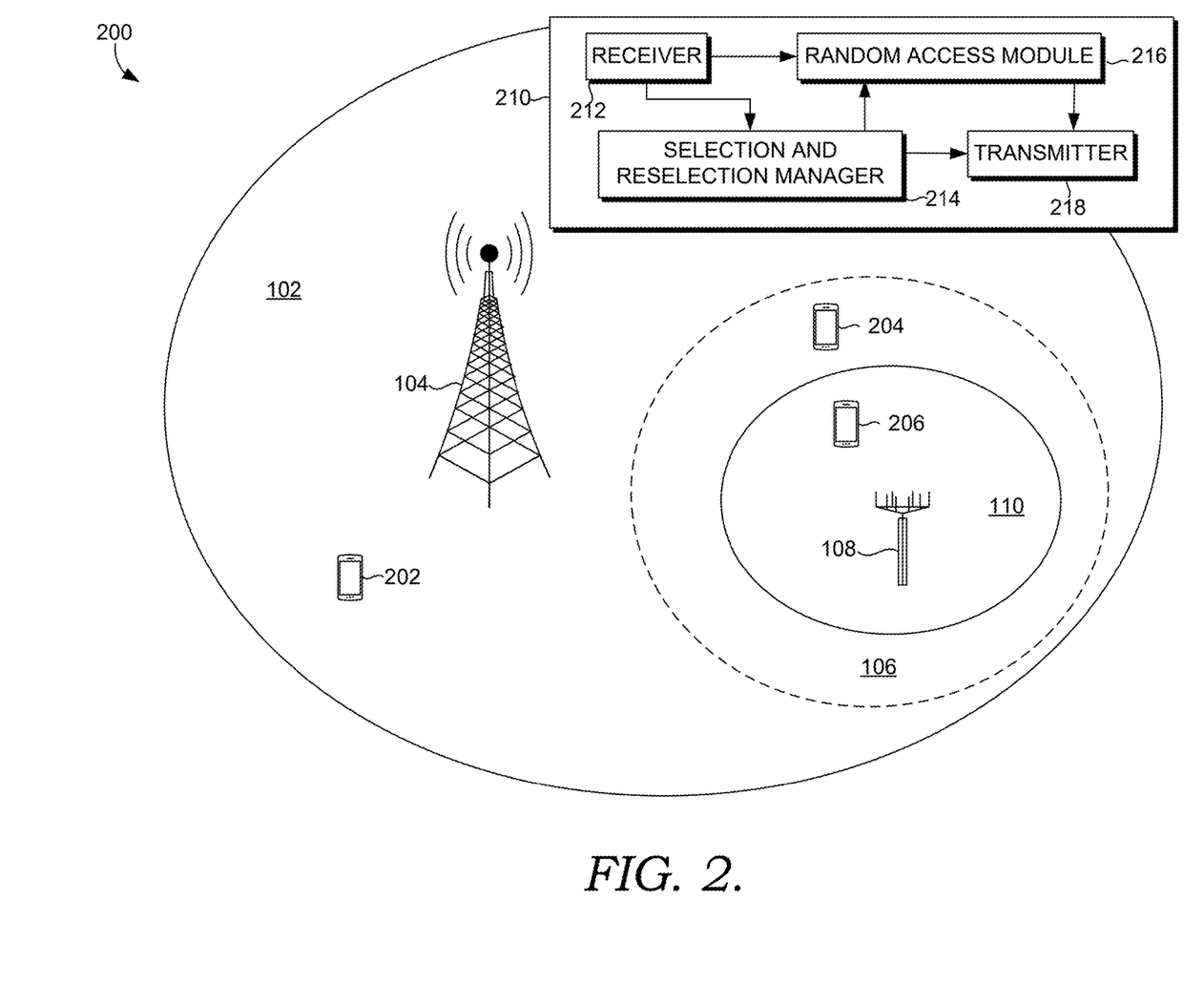
FIG. 2 depicts an example environment comprising a first cell site providing a larger coverage area than a second cell site, in accordance with aspects herein.

FIG. 2 depicts example environment 200 comprising a first coverage area 102 provided by a first cell site 104, a second coverage area 106 provided by a second cell site 108, and a reduced coverage area 110 of the second cell site 108. Additionally, example environment 200 comprises user device 202 within the first coverage area 102, user device 204 within the first coverage area 102 and the second coverage area 106, and user device 206 within the first coverage area 102 and the reduced coverage area 110. In addition, example environment 200 comprises apparatus 210 comprising receiver 212, selection and reselection manager 214, random access module 216, and transmitter 218.

The first cell site 104 and the second cell site 108 may include one or more cellular base stations, nodes, RRUs control components, and other components for providing a wireless interface between a network and a user device. In aspects, one or more nodes (e.g., eNB, gNB, and the like) of the first cell site 104 and the second cell site 108 are configured to communicate with one or more user devices. In some embodiments, the first cell site 104 and the second cell site 108 are interconnected to one another or to one or more other cell sites or network nodes in the example environment 200 through various types of backhaul interfaces (e.g., a direct physical connection, a virtual network, or another suitable transport network). In aspects, the second cell site 108 may communicate with the first cell site 104 and a UE for facilitating communication between the second cell site 108 and the first cell site 104. In aspects, the first cell site 104 may communicate with the second cell site 108 and a UE for facilitating communication between the first cell site 104 and the second cell site 108.

In some aspects, the first cell site 104 or the second cell site 108 may include one or more band pass filters, radios, antenna arrays, power amplifiers, transmitters/receivers, digital signal processors, control electronics, GPS equipment, and the like. An eNB or gNB (and other types of nodes) corresponding to the first cell site 104 or the second cell site 108 may comprise one or more of a macro base station, a small cell or femtocell base station, a relay base station, a combination thereof, and so forth. In aspects, the first cell site 104 or the second cell site 108 may be configured as FD-MIMO, massive MIMO, MU-MIMO, cooperative MIMO, 3G, 4G, 5G, another generation communication system, or 802.11. In addition, the first cell site 104 or the second cell site 108 may operate in an extremely high frequency region of the spectrum (e.g., from 30 GHz to 300 GHz), also known as the millimeter band. In some embodiments, example environment 200 comprises additional cell sites each providing a coverage area.

As depicted in example environment 200, the first coverage area 102 is larger than the second coverage area 106. In some embodiments, the first coverage area 102 or the second coverage area 106 is not stationary, such that the first coverage area 102 or the second coverage area 106 moves according to a location of a UE or a plurality of UEs. In some embodiments, the first coverage area 102 or the second coverage area 106 allows unrestricted access by UEs having a service subscription. In some embodiments, the first coverage area 102 or the second coverage area 106 allows restricted access by UEs having association with the corresponding cell site (e.g., UEs in a Closed Subscriber Group, UEs for users in the home having a femtocell, etc.).

Each of the first coverage area 102 and the second coverage area 106 provides wireless telecommunications services, such as radio waves (e.g., Bluetooth®), satellite communication, infrared communication, microwave communication, Wi-Fi, millimeter wave communication, and other forms of wireless communication, for example. User devices within a coverage area may access a network for connection to a corresponding immediate service provider for telecommunications services such as 5G and LTE, for example. In aspects, telecommunications services comprise one or more of voice communications, message communications (e.g., SMS messages, MMS messages, instant messaging messages, EMS messages), data services, or a combination thereof.

In aspects, the larger first coverage area 102 is provided by a macro cell, wherein the macro cell is a first type of the first cell site 104. In some embodiments, the macro cell comprises a tower-mounted antenna structure that provides a broad range coverage area. The first cell site 104 may have one or more signal qualities, an amount of traffic communicated by the first cell site 104 over a particular period of time, a number of user devices communicatively coupled to the first cell site 104 over a particular period of time, and so forth. Each of the one or more signal qualities, the amount of traffic over the particular period of time, and the number of user devices communicatively coupled to the first cell site 104 over the particular period of time may be stored at a database for retrieval. Additionally, each may be received by the receiver 212 of apparatus 210. Further, in embodiments where the cell site type of the first cell site 104 is a macro cell, the macro cell may have characteristics comprising an RSRP, an RSRQ, or an amount of megabytes transmitted via a downlink over a particular period of time. Each of these may be stored at a database for retrieval or received by the receiver 212 of apparatus 210.

In aspects, the first cell site 104 has a transmission power that is one or more orders of magnitude greater than the transmission power of the second cell site 108. The first cell site 104 may also have an antenna footprint that is larger than the antenna footprint of the second cell site 108. As such, in some aspects, the type of the first cell site 104 is a macro cell and a type of the second cell site 108 is a small cell, a picocell, a microcell, or another type of cell site having an antenna structure that provides a coverage area that is smaller or narrower than the macro cell. In some aspects, the type of the first cell site 104 is a type other than the macro cell and a type of the second cell site 108 is a cell site having a coverage area that is smaller than the coverage area of the first cell site 104. Each transmission power and antenna footprint of the first cell site 104 and the second cell site 108 may be received by the receiver 212.

In some embodiments, example environment 200 comprises a heterogeneous network that includes eNBs or gNBs of different types (e.g., one or more macro eNBs, one or more pico eNBs, one or more femto eNBs, one or more relays, one or more macro gNBs, one or more pico gNBs, one or more femto gNBs, one or more relays, etc.). These different types of eNBs and gNBs may have different transmit power levels, different coverage areas, and different impact on interference in the heterogenous network. For example, macro eNBs or gNBs may have a high transmit power level (e.g., 20 Watts), whereas the pico eNBs, femto eNBs, pico gNBs, femto gNBs and relays may have a lower transmit power level (e.g., 1 Watt). In aspects, the type of the first cell site 104 is a macro eNB or a macro gNB and the type of the second cell site 108 is a small cell eNB, a pico eNB, a femto eNB, a small cell gNB, a pico gNB, or a femto gNB. Further, the transmit power levels, coverage areas, and interference impact of each of the first cell site 104 and the second cell site 108 may be received by the receiver 212. Additionally, the receiver 212 may receive the type of the first cell site 104 and the type of the second cell site 108. For example, the receiver 212 may receive the type of each of the cell sites within the heterogeneous network for generating an SIB.

In some embodiments, the cell site type of the second cell site 108 is a small cell, a femtocell, a picocell, a microcell, or another type of cell site having an antenna structure that provides a coverage area that is smaller or narrower than the first coverage area 102 of the first cell site 104. In aspects, the cell site types that provide a coverage area smaller or narrower than the first coverage area 102 of a macro cell may comprise characteristics that indicate that the cell site is not a macro cell. For example, some of the characteristics indicating the cell site is not a macro cell may include an installation height, a transmission power, an antenna model, a period of deployment, having a physical location or a percentage of a defined coverage area location indoors (e.g., within a building or structure), an antenna tilt, a width of a transmission beam, a frequency band of a transmission beam, a combination thereof, and so forth. Each of these characteristics indicating the cell site is not a macro cell may be received by the receiver 212 for generation of the SIB with this identification information.

As shown in FIG. 2, UEs 202, 204, and 206 may communicate by way of transmission with the first cell site 104 using one or more of 4G and 5G, sometimes simultaneously. Further, UEs 204 and 206 may communicate by way of transmission with the second cell site 108 using one or more of 4G and 5G, sometimes simultaneously. Additionally, other wireless communication protocols may be utilized in conjunction with aspects described herein, as LTE and 5G are used for exemplary purposes only and not for limitation. In addition, UEs 202, 204, and 206 are configured to receive SIB transmissions (e.g., SIB1, SIB2) via antennas and wireless radios associated with UEs 202, 204, and 206. In some aspects, UEs 202, 204, and 206 store data associated with the SIB transmissions received in memory. An example of the data associated with the SIB transmission is discussed below with respect to FIG. 3. The SIB transmission received by the UEs 202, 204, and 206 are used for cell selection and reselection by the UEs.

One improvement of the technology disclosed herein over the conventional technologies and methods includes maintaining mobility in a wireless communication network, such that UEs may remain in one coverage area or travel from one coverage area to another coverage area without delays in accessing or using telecommunication services or delays in handover. In aspects, one or more of UEs 202, 204, and 206 may be in an idle mode or a connected state with respect to a network of example environment 200. A UE that is in an idle mode is not attached to the first cell site 104 or the second cell site 108, and no telecommunications services are allocated to the UE in idle mode. When one of the UEs 202, 204, and 206 is in idle mode, that UE may select one of a plurality of identified candidate cell sites to camp on.

The procedure for the UEs 202, 204, and 206 in selecting and camping on a cell is referred to as cell selection. While camping on a coverage area, the UE continues to monitor other coverage areas. Upon detection by the UE of a degradation in the received signal quality from the currently camped coverage area (e.g., from mobility), the UE may decide to camp on another cell. As such, the evaluation and reselection of another coverage area while camping on a serving cell site is referred to as cell reselection. Cell reselection may also be informally referred to as cell selection herein for ease of reference.

The apparatus 210 of example environment 200 generates and transmits messages (e.g., SIB1, SIB2, etc.) for controlling cell site selection by a user device in a network for a telecommunications service, thereby maintaining mobility in a wireless communication network such that UEs may remain in one coverage area or travel from one coverage area to another coverage area without delays in accessing or using telecommunication services or delays in handover. The apparatus 210 may be coupled to one or more cell sites to provide coordination and control for the one or more cell sites and cell selection and reselection by the UEs. In some embodiments, the apparatus 210 is an entity separate from the one or more cell sites. In some embodiments, the apparatus 210 may be the first cell site 104 or the second cell site 108. The apparatus 210 may communicate with the one or more cell sites via a wired or wireless backhaul. The apparatus 210 may also communicate with UEs via the network. The first cell site 104 and the second cell site 108 may also communicate with one another (e.g., directly or indirectly via a wireless or wired backhaul).

The apparatus 210 includes means for transmitting an information block (e.g., SIB1, S1B2, etc.) to a UE while the UE is in an idle mode or camped on a cell site (e.g., the first cell site 104 or the second cell site 108). The information block may include an indication of a random access configuration for performing at least a part of a random access procedure. The apparatus 210 may include means for performing, with the UE, at least a part of a random access procedure based on the random access configuration indicated. In some embodiments, the information block includes a cell identifier that indicates the random access procedure. In some embodiments, the information block is a subset of the SIB1.

The apparatus 210 comprises the receiver 212, the selection and reselection manager 214, the random access module 216, and the transmitter 218. The receiver 212, the selection and reselection manager 214, the random access module 216, and the transmitter 218 may be associated with software modules running in a processor operating via computer readable media. Further, the receiver 212, the selection and reselection manager 214, the random access module 216, and the transmitter 218 may be associated with one or more hardware components coupled to the processor or a plurality of processors. The order of the receiver 212, the selection and reselection manager 214, the random access module 216, and the transmitter 218 in the apparatus 210 disclosed in example environment 200 may be rearranged. For example, some components of the apparatus 210 may be combined or omitted.

In some embodiments, the apparatus 210 includes transmitter 218 for transmitting system information during the random access procedure. For example, the system information may be sent via transmitter 218 in a random access response to a UE to indicate a random access configuration for performing a remainder of the random access procedure. Additionally, the apparatus 210 may receive data from the UE (e.g., based on the system information sent in the random access response) via the receiver 212. Further, the receiver 212 may receive information from the first cell site 104 or the second cell site 108 (e.g., the receiver 212 may receive a configuration for subframes to utilize in data transmissions with the UE). The transmitter 218 transmits one or more information blocks (e.g., SIB1, SIB2, etc.) to a UE while the UE is in an idle mode or camped on the first cell site 104 or the second cell site 108.

In aspects, the information block generated by the apparatus 210 includes an indication of a random access configuration for performing at least a part of a random access procedure. The random access module 216 may be configured to perform, with a UE, at least a part of a random access procedure based on an indicated random access configuration. For example, the random access module 216 may transmit system information during a random access procedure to one or more of UEs 202, 204, and 206 and may receive responses from the UEs 202, 204, and 206 based on the system information transmitted. Further, upon receipt by the receiver 212 of a configuration for subframes from the first cell site 104 or the second cell site 108, selection and reselection manager may utilize the configuration for generating and transmitting an SIB message to one or more of the UEs 202, 204, and 206.

The apparatus 210 receives information from one or more of the first cell site 104 and the second cell site 108 via the receiver 212 for generating the information block to transmit to one or more of UEs 202, 204, and 206 via transmitter 218. For example, the apparatus 210 may receive information (that is included in the generated information block) identifying a type of the first cell site 104 or a type of the second cell site 108. The information identifying the type of the cell site is included in the generated information block generated by apparatus 210. The generated information block identifies the type of the first cell site 104 as a macro cell and the type of the second cell site 108 as a small cell, for example.

The generated information block identifies the first cell site 104 or the second cell site 108 as a macro cell, a small cell, a femtocell, a picocell, a microcell, or another type of cell site having an antenna structure that provides a coverage area that is smaller or narrower than the first coverage area 102 of the first cell site 104. For example, the information identifying the type of the cell site may also include an area or range associated with the larger first coverage area 102 and an area or range associated with the second coverage area 106, thereby identifying the type of the first cell site 104 as macro cell. In some embodiments, the information identifying the type of the cell site may also include an antenna structure associated with the first cell site 104 or the second cell site 108. Additionally, the information identifying the type of the cell site may also include one or more signal qualities, an amount of traffic communicated by the cell site over a particular period of time, and a number of user devices communicatively coupled to the cell site over a particular period of time, each of which being associated with the first cell site 104 or the second cell site 108.

In aspects, the information identifying the type of the cell site may also include a transmission power of each cell site, thereby indicating that the first cell site 104 has a transmission power that is one or more orders of magnitude greater than the transmission power of the second cell site 108. Additionally, the information identifying the type of the cell site may also include an antenna footprint for one or more cell sites. Further, the information identifying the type of the cell site may also include cell site characteristics comprising an RSRP, an RSRQ, or an amount of megabytes transmitted via a downlink over a particular period of time. Furthermore, the information identifying the type of the cell site in the information block may also identify the cell site type as a macro eNB, a macro gNB, a small cell gNB, a small cell eNB, a pico eNB, a femto eNB, a pico gNB, a femto gNB, and so forth. The identifying information may also identify the type of cell site as a 3G, 4G, 5G, or another generation communication protocol.

The one or more information blocks (e.g., SIB1, SIB2, etc.) transmitted to a UE (directly from the transmitter 218 or indirectly from the transmitter 218 from the first cell site 104 or the second cell site 108) may also comprise user device priority information of the first cell site or the second cell site for serving user devices via a telecommunications service (e.g., one or more of voice communications or message communications). The user device priority information may identify, for example, that the first cell site or the second cell site prioritizes serving ENDC UEs over serving 4G-only UEs. In some aspects, the user device priority information identifies that the first cell site or the second cell site prioritizes serving UEs having a particular subscription to a particular telecommunications service provided by the first cell site or the second cell site.

The one or more information blocks (e.g., SIB1, SIB2, etc.) transmitted may also comprise cell access information, schedule information for the scheduling of other SIB messages, and common and shared channel configuration information and random access channel procedure configuration information. For example, the information block may include information associated with a mapping of SIBs to an SIB message, SIB periodicity, and an SIB-window size. The cell access information may include PLMN information, a tracking area code, a radio access network code, and a cell identity parameter identifying a coverage area within the PLMN. In some embodiments, the information block includes twelve PLMNs associated with the cell access information. In some embodiments, the cell access information may include a parameter indicating that a coverage area is reserved for another use (e.g., camping is allowed for only particular UEs).

In aspects, one or more of UE 202, 204, and 206 receive one or more SIBs from the apparatus 210, the first cell site 104, the second cell site 108, or a combination thereof. The one or more SIBs include information identifying the type of the first cell site 104, the type of the second cell site 108, a type of another cell site, or a combination thereof. The one or more SIBs may also include one or more of the user device priority information, the cell access information, the schedule information, the common and shared channel configuration information and random access channel procedure configuration information, or a combination thereof. The one or more UE 202, 204, and 206 may receive the one or more SIBs while in an idle mode or while camping on the first cell site 104 or the second cell site 108. In some embodiments, the one or more UEs 202, 204, and 206 receive an SIB after transmitting a registration request for setting up a Radio Resource Control connection. For example, the UE may determine that the Radio Resource Control connection associated with the first cell site 104 or the second cell site 108 is to be re-established and may subsequently transmit the registration request. As another example, the UE may transmit the registration request in response to a Radio Resource Control connection failure.

In aspects, UE 202, 204, or 206 performs at least part of a random access procedure with the first cell site 104 or the second cell site 108 based on the received SIB (e.g., SIB1, SIB2, etc.). In some aspects, UE 202, 204, or 206 receives a first SIB transmission, such as an SIB1 for example, associated with the first cell site 104. The first SIB transmission comprises the information identifying a first type of the first cell site 104 (e.g., a macro cell, a macro gNB, a macro eNB, etc.). In some aspects, the first SIB transmitted to UE 204 or 206 also comprises the information identifying a second type of the second cell site 108 (e.g., a small cell, a small cell gNB, a small cell eNB, a picocell, a pico gNB, a pico eNB, a relay, a microcell, a micro gNB, a micro eNB, a femtocell, a femto gNB, a femto eNB, etc.).

In some aspects, UE 204 or 206 also receives a second SIB transmission associated with the second cell site 108. The second SIB transmission comprises the information identifying the second type of the second cell site 108 (e.g., a small cell, a small cell gNB, a small cell eNB, a picocell, a pico gNB, a pico eNB, a relay, a microcell, a micro gNB, a micro eNB, a femtocell, a femto gNB, a femto eNB, etc.). In aspects, the information identifying the second type of the second cell site may indicate that the second cell site 108 provides a smaller coverage area than the coverage area of the first cell site 104. In aspects, the information identifying the second type of the second cell site may indicate that the second cell site 108 has a lower transmission power than the first cell site 104. In addition, the information identifying the second type of the second cell site 108 may indicate that the second cell site 108 has a smaller antenna footprint than the first cell site 104. The information identifying the second type may also indicate that an antenna structure of the second cell site 108 is smaller than the antenna structure of the first cell site 104.

Based on the UE 204 or 206 receiving the first SIB transmission or the first SIB transmission and the second SIB transmission, the UE 204 or 206 selects the second cell site 108 as a serving cell site for the user device based at least in part on the identified type of the first cell site 104 or the second cell site 108. In some embodiments, the UE 204 or 206 may compare the information identifying the first type of the first cell site and the information identifying the second type of the second cell site and subsequently select the second cell site 108 as the serving cell site for the user device based at least in part on the comparison. For example, the UE 204 or 206 may compare the information including a transmission power of the first cell site 104 and a transmission power of the second cell site 108, an antenna footprint of the first cell site 104 and an antenna footprint of the second cell site 108, an antenna structure of the first cell site 104 and an antenna structure of the second cell site 108, and a size or range of the first coverage area and a size or range of the second coverage area 106. In some aspects, the UE 204 or 206 may compare an amount of traffic communicated by the first cell site 104 over a particular period of time and an amount of traffic communicated by the second cell site 108 over a particular period of time. In some aspects, the UE 204 or 206 may compare a number of user devices communicatively coupled to the first cell site 104 over a particular period of time and a number of user devices communicatively coupled to the second cell site 108 over a particular period of time.

By the UE 204 or 206 selecting the second cell site 108 as a serving cell site for the UE 204 or 206 based at least in part on the identified type of the first cell site 104 or the second cell site 108, mobility of the UE 204 or 206 in the wireless communication network is maintained. For example, UEs 204 or 206 may remain in one coverage area or travel from one coverage area to another coverage area (e.g., from the reduced coverage area 110 towards the cell edge of the second coverage area 106) without delays in accessing or using telecommunication services or delays in handover. Additionally, by the UEs 204 or 206 selecting the second cell site 108 as the serving cell site, cell sites other than the macro cell are utilized more efficiently, thereby reducing the dominance effect from the high radio frequency power of the macro cell in overlapping coverage areas. As such, coverage balancing is improved, interference is decreased, frequency-diversity is improved, data throughput is improved, and bandwidth availability is improved.

Figure 3:
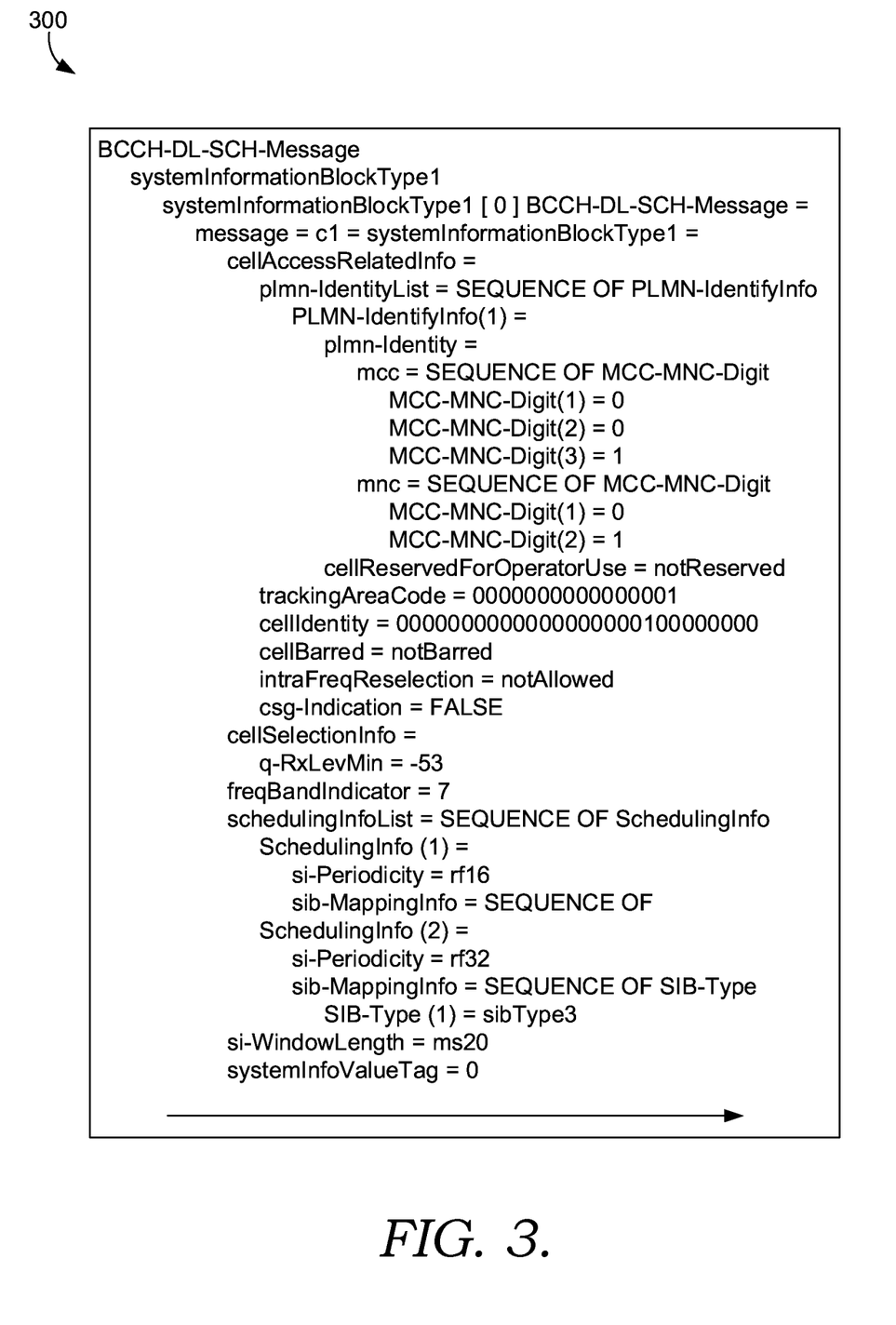
FIG. 3 illustrates an example System Information Block Type 1 comprising cell access related information and scheduling information, in accordance with aspects herein.

FIG. 3 illustrates an example SIB1 300. The example SIB1 300 comprises cell access related information and scheduling information. For example, the cell access related information includes a PLMN identity list, a PLMN identity, a mobile country code (MCC) and a mobile network code (MCN), a sequence digit of the MCC and MNC, an indication that the cell is not reserved for operator use, a tracking area code, a cell identity number, an indication that the cell is not barred, and an indication that the intra-frequency reselection is not allowed. Example SIB 300 may also include cell selection information including a minimum required receiver level in the cell (e.g., in dBm), a frequency band indicator, a scheduling list including SI-periodicity and SIB mapping information, an SI-window length, and a system information value tag. The information in example SIB1 300 is transmitted to a user device and the user devices uses at least a portion of this information for cell selection and reselection. In some aspects, the cell selection and reselection is determined by the user device based on a type of the cell site being selected having a higher weighted value in the determination relative to the other information in the example SIB1 300.

Figure 4:
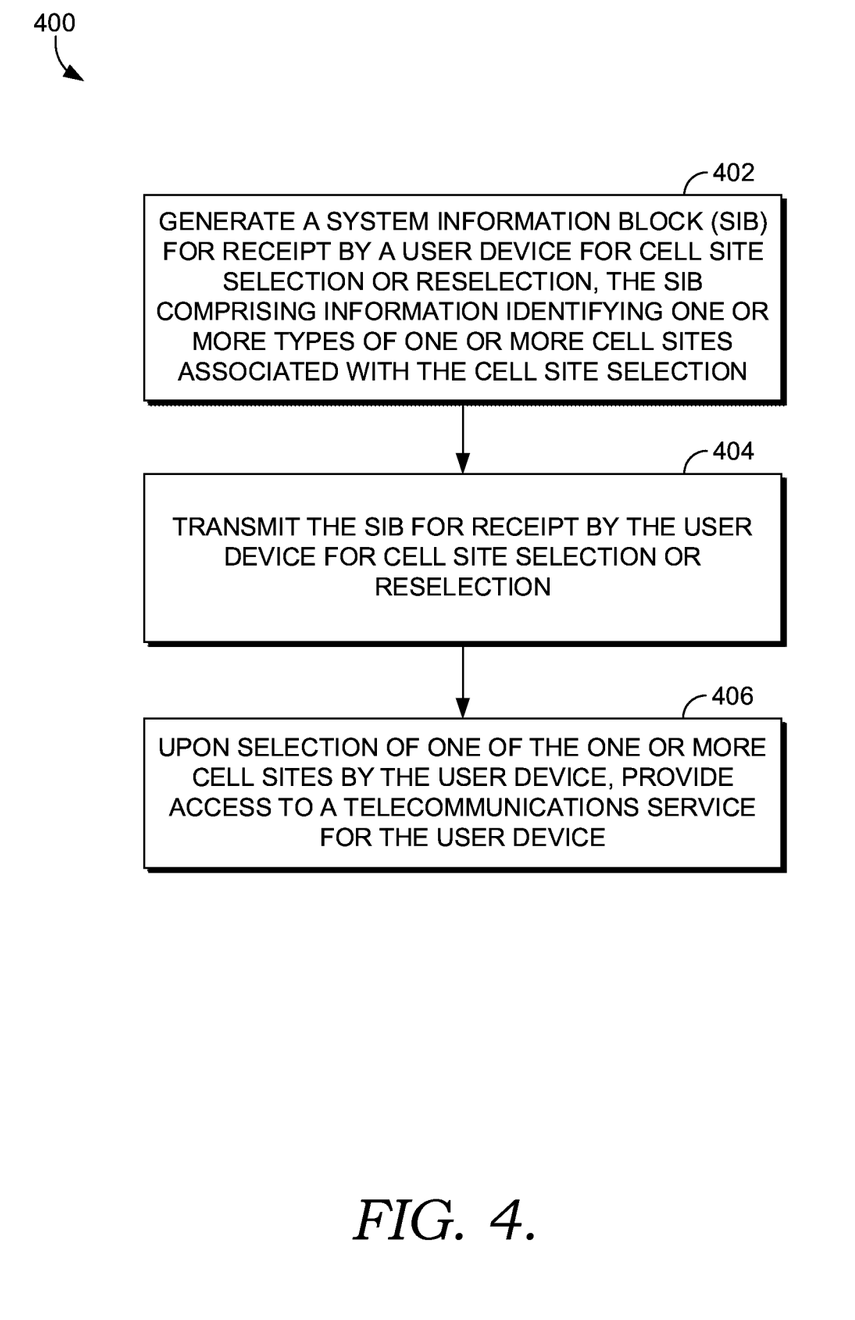
FIG. 4 depicts a flow diagram of an example method for controlling cell site selection by a user device in a telecommunications system, in accordance with aspects herein.

FIG. 4 depicts a flow diagram of an example method for controlling cell site selection by a user device in a telecommunications system. At 402, an SIB (e.g., SIB1) is generated for receipt by a user device for cell site selection or reselection. The SIB may comprise information identifying one or more types of one or more cell sites associated with the cell site selection. The information may identify the one or more types of the one or more cell sites as a cell site other than a macro cell. In some embodiments, the type of the one of the one or more cell sites may be a femtocell, a picocell, or a micro cell. The information identifying the one or more types of the one or more cell sites may include a transmission power associated with the one or more cell sites. Further, the information may identify the type of the cell site as a small cell eNB or a small cell gNB. In some embodiments, the information of the SIB may indicate that one of the one or more cell sites provides a smaller coverage area than a coverage area of a neighboring cell site. Continuing the example, the user device receiving the SIB is within the coverage area of the neighboring cell site and the smaller coverage area. In addition to the information identifying the one or more types of the one or more cell sites, the SIB may comprise other information of example SIB1 300 in FIG. 3.

In some aspects, a first SIB and a second SIB are generated for receipt by a user device for cell site selection or reselection. The first SIB message comprises information identifying a first type of a first cell site and the second SIB message comprising information identifying a second type of a second cell site. In aspects, the information of the first SIB message identifies the first type of the first cell site as a macro cell and the information of the second SIB message identifies the second type of the second cell site as a small cell. In some aspects, the first SIB message and the second SIB message are SIB1 messages. In some aspects, the information of the first SIB message identifies the macro cell as a 5G or 4G base station and the information of the second SIB message identifies the small cell as a 5G or 4G base station. In aspects, the first SIB message or the second SIB message comprises user device priority information of the first cell site and the second cell site for serving user devices via the telecommunications service. In some embodiments, the first SIB message and the second SIB message comprise cell access information.

At 404, the SIB is transmitted for receipt by one or more user devices for cell site selection or reselection. In some aspects, the first SIB message and the second SIB messages are transmitted to the one or more user devices. Each SIB transmitted to the one or more user devices comprises information identifying one or more types of one or more cell sites. Further, at 406, upon selection of a cell site by the user device receiving at least one SIB, access to one or more telecommunications services is provided to the user device. For example, the user device may begin camping on a coverage area of the selected cell site. In some embodiments, the user device was camping on another cell site prior to selecting the selected cell site. In some embodiments, the user device was in an idle mode prior to selecting the selected cell site. In some embodiments, the user device was camping on the selected cell site prior to selecting the selected cell site. In some aspects, the one or more telecommunications services comprise one or more of the transfer of information via radio waves (e.g., Bluetooth®), satellite communication, infrared communication, microwave communication, Wi-Fi, millimeter wave communication, mobile communication, or a combination thereof. In some aspects, the one or more telecommunications services comprise one or more of voice communication, message communication (e.g., SMS messages, MMS messages, instant messaging messages, EMS messages), data services that the user device has a registration or subscription to, or a combination thereof.

Figure 5:
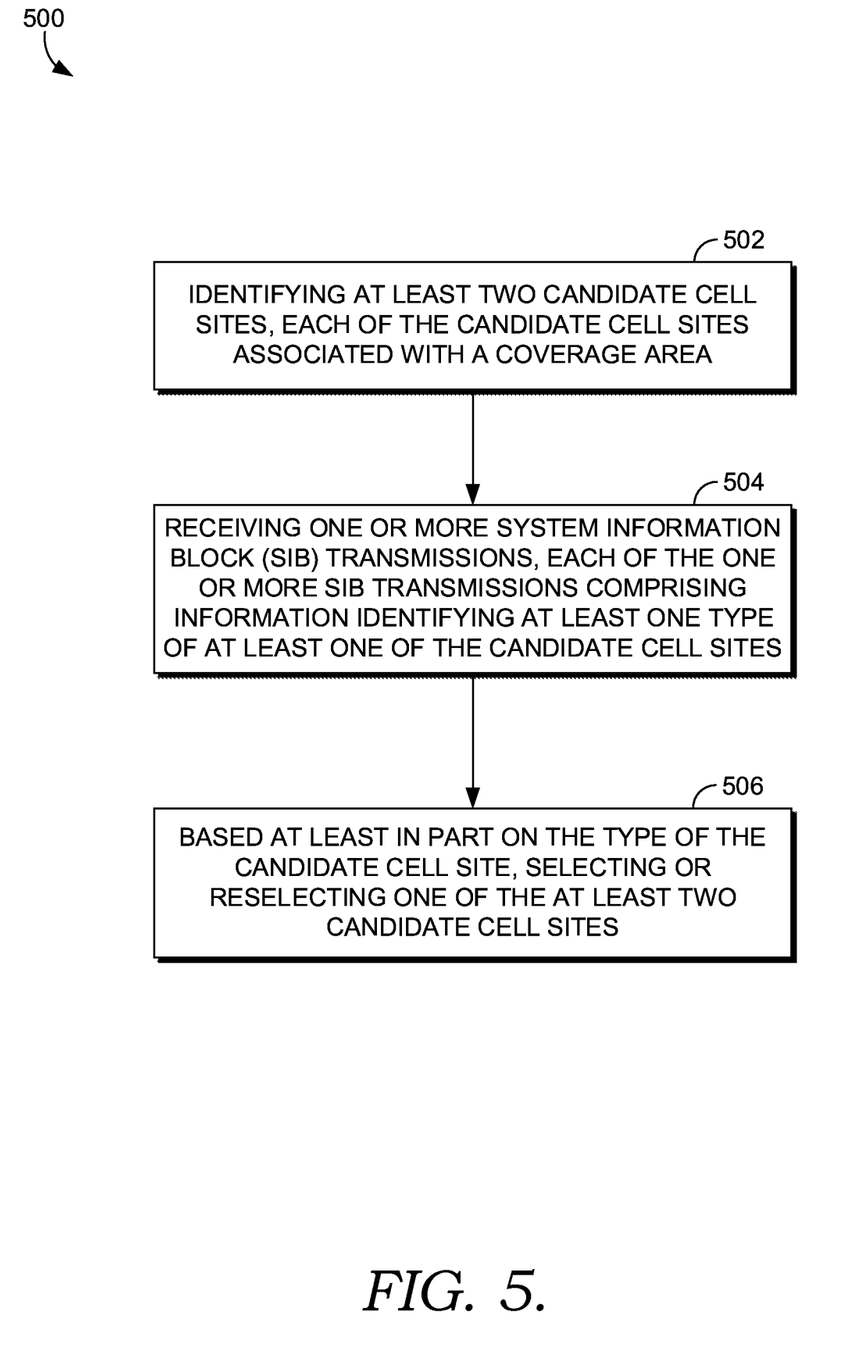
FIG. 5 depicts another flow diagram of an example method for controlling cell site selection by a user device in a telecommunications system, in accordance with aspects herein.

FIG. 5 depicts another flow diagram of an example method for controlling cell site selection by a user device in a telecommunications system. At 502, at least two candidate cell sites are identified by a user device. For example, each of the candidate cell sites identified are associated with at least one coverage area. Continuing the example, the user device is located within the at least one coverage area of each of the candidate cell sites identified. In some aspects, the user device determines a radio link quality corresponding to each of the at least two candidate cell sites. For example, the user device determines a first radio link quality corresponding to a first candidate cell site of the at least two candidate cell sites and a second radio link quality corresponding to a second candidate cell site of the at least two candidate cell sites.

In some aspects, the user device determines the first radio link quality and the second radio link quality by monitoring a downlink quality associated with the candidate cell sites based on one or more metrics of the downlink radio link quality. For example, the first radio link quality and the second radio link quality may be determined using specific cell reference signals received, narrowband reference signals received, or a combination thereof. In some aspects, the user device determines a signal strength corresponding to each of the at least two candidate cell sites. For example, the user device determines a first signal strength of a first candidate cell site of the at least two candidate cell sites and a second signal strength of a second candidate cell site of the at least two candidate cell sites.

The signal strength (e.g., the first signal strength, the second signal strength, another signal strength, or a combination thereof) may be determined by the user device while the user device was at a location during a voice call conducted by the user device. In some aspects, the signal strength is determined based on an RSRP of a corresponding candidate cell site. In some aspects, the user device determines that the second signal strength is stronger than the first signal strength. In some aspects, the user device determines that the first signal strength is stronger than the second signal strength. In some aspects, the first signal strength or the second signal strength is determined based on a comparison of a prior signal strength measurement. In some embodiments, the first signal strength satisfies a minimum RX level of the user device and the second signal strength does not satisfy the minimum RX level. In some embodiments, the first signal strength does not satisfy the minimum RX level of the user device and the second signal strength satisfies the minimum RX level. In some embodiments, both the first signal strength and the second signal strength satisfy the minimum RX level of the user device.

At 504, the user device receives one or more SIB transmissions, each of the one or more SIB transmissions comprising information identifying at least one type of at least one of the candidate cell sites. In some embodiments, the user device receives a first SIB1 transmission associated with the first candidate cell site, the first SIB1 transmission comprising information identifying a first type of the first cell site. In some embodiments, the user device also receives a second SIB1 transmission associated with the second candidate cell site, the second SIB1 transmission comprising information identifying a second type of the second candidate cell site, the second candidate cell site providing a smaller coverage area than the first candidate cell site. In aspects where the user device receives only the first SIB1 transmission, the first SIB1 transmission may also comprise information identifying the second type of the second candidate cell site. In some embodiments, the first type of the first candidate cell site is a macro cell. In some embodiments, the user device receives the first SIB1 transmission and the second SIB1 transmission while in idle mode.

At 506, the user device selects or reselects one of the at least two candidate cell sites based at least in part on the type of the candidate cell site identified in the one or more SIB transmissions, the one of the at least two candidate cell sites selected as a serving cell site for the user device. In some embodiments, the one of the at least two candidate cell sites is selected or reselected based on (1) a first comparison of the first type of the first candidate cell site with the second type of the second candidate cell site and (2) a second comparison of the first radio link quality and the second radio link quality. In some aspects, the first type and the second type are given more weight, in the determination to select or reselect the first candidate cell site or the second candidate cell site, than the first radio link quality and the second radio link quality. In some embodiments, the second candidate cell site is selected or reselected based on the second type of the second candidate cell site and a comparison of the first signal strength to the second signal strength, the second signal strength being above a threshold. In some aspects, the second type is given more weight, in the determination to select or reselect the second candidate cell site, than the comparison of the first signal strength to the second signal strength.

In some aspects, the user device additionally selects a non-standalone operating mode upon selection or reselection of the one of the at least two candidate cell sites. In some embodiments, the user device selects the non-standalone operating mode upon selection or reselection of the second candidate cell site, the operating mode selected while camping on a coverage area of the second candidate cell site using a frequency band, the coverage area of the second candidate cell site being smaller than the coverage area of the first candidate cell site. In some aspects, the user device selects an operating mode upon selection or reselection of the one of the at least two candidate cell sites, the operation mode being from an LTE mode or a Standalone mode. In some aspects, the operating mode is selected based on at least system information of the candidate cell site selected, a power consumption level associated with the candidate cell site selected, or a combination thereof.

Figure 6:
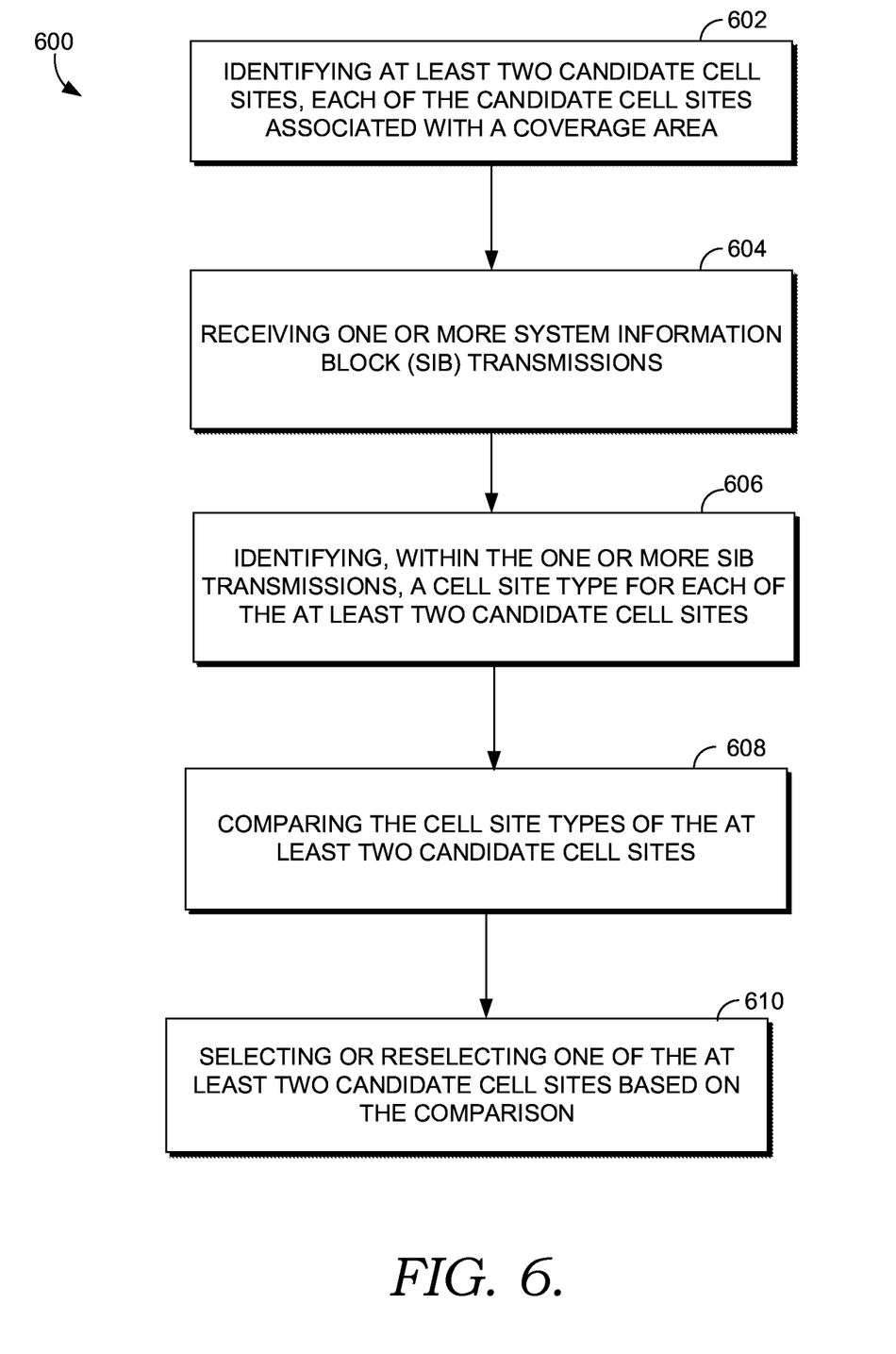
FIG. 6 depicts yet another flow diagram of an example method for controlling cell site selection by a user device in a telecommunications system, in accordance with aspects herein.

FIG. 6 depicts yet another flow diagram of an example method for controlling cell site selection by a user device in a telecommunications system. At 602, a user device identifies at least two candidate cell sites, each of the candidate cell sites being associated with at least one coverage area. At 604, the user device receives one or more SIB transmissions, each of the one or more SIB transmissions comprising information identifying at least one cell site type of one or more of the at least two candidate cell sites. In some embodiments, one SIB transmission comprises information identifying a first cell site type for one of the at least two candidate cell sites and a second cell site type for another of the at least two candidate cell sites. At 606, the user device identifies the first cell site type and the second cell site type from the one or more received SIB transmissions. At 608, the user device compares the first cell site type and the second cell site type. In some aspects, the user device compares the information identifying the first cell site type and the information identifying the second cell site type. At 610, the user device selects or reselects one of the at least two candidate cell sites having the second cell site type as a serving cell site for the user device.

Figure 7:
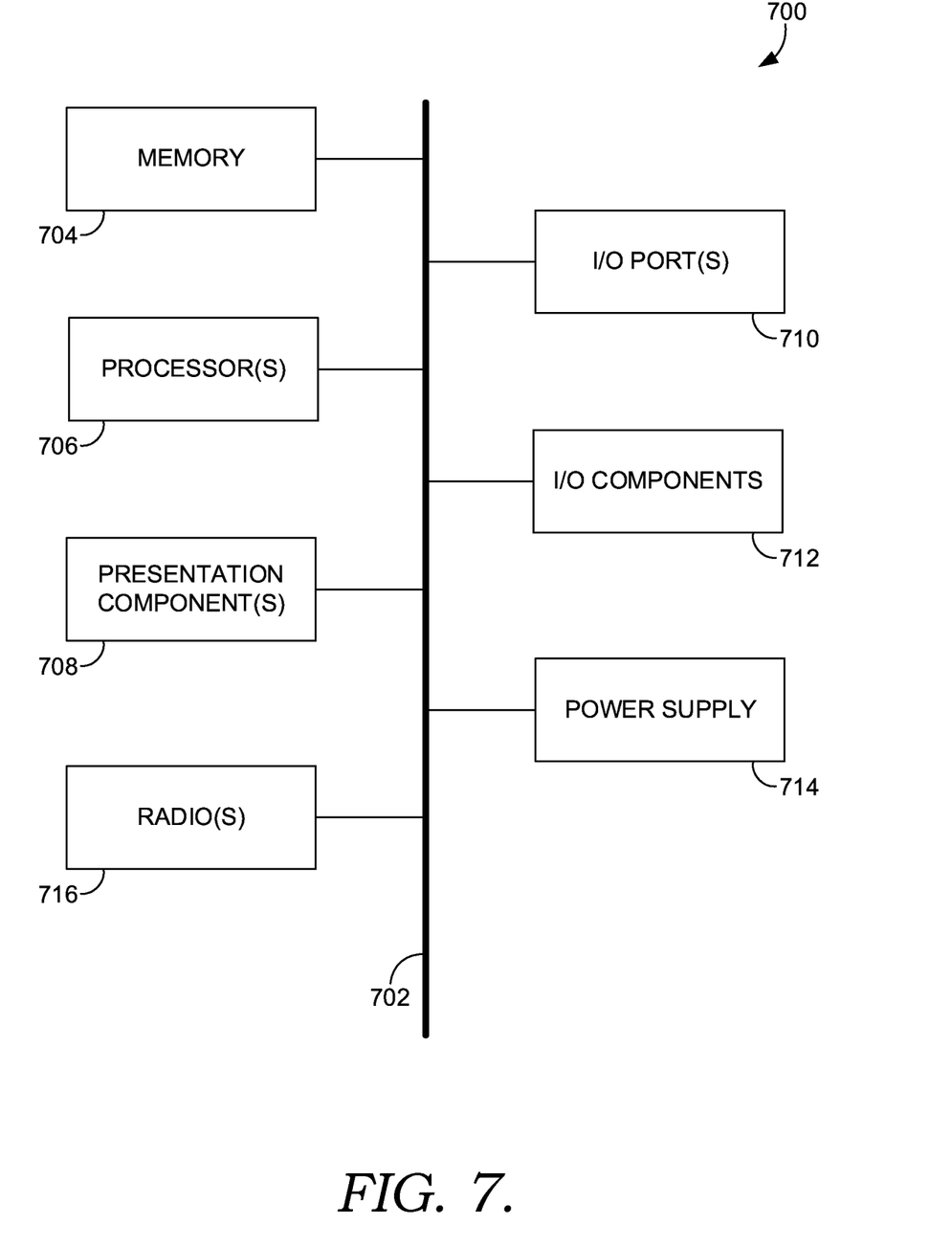
FIG. 7 depicts an example user device suitable for use in implementations of the present disclosure, in accordance with aspects herein.

Turning now to FIG. 7, a diagram is depicted of an exemplary computing environment suitable for use in implementations of the present disclosure. In particular, the exemplary computer environment is shown and designated generally as user device 700. User device 700 is but one example of a suitable computing environment and is not intended to suggest any limitation as to the scope of use or functionality of the invention. Neither should user device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, user device 700 includes bus 702 that directly or indirectly couples the following devices: memory 704, one or more processors 706, one or more presentation components 708, input/output (I/O) port(s) 710, I/O component(s) 712, power supply 714, and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O component(s) 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "user device."

User device 700 typically includes a variety of computer-readable media. Computer-readable media can be any available media that can be accessed by user device 700. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 704, memory 704 includes computer-storage media in the form of volatile and/or nonvolatile memory. Memory 704 may be removable, nonremovable, or a combination thereof. Examples of memory 704 include solid-state memory, hard drives, optical-disc drives, etc. For instance, memory 704 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 706, the one or more processors 706 read data from various entities such as bus 702, memory 704 or I/O component(s) 712. The one or more processors 706 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 706 execute instructions, for example, of an Operating System of the user device 700 and/or of one or more suitable applications.

Further, the one or more presentation components 708 present data indications to a person or other device. Examples of one or more presentation components 708 include a display device, speaker, printing component, vibrating component, etc. Additionally, I/O port(s) 710 allow user device 700 to be logically coupled to other devices including I/O component(s) 712, some of which may be built in user device 700. Illustrative I/O component(s) 712 include a microphone, joystick, game pad, satellite dish, scanner, printer, wireless device, etc. Furthermore, power supply 714 may include any suitable source of power, such as a rechargeable lithium polymer battery and/or an alternating current power converter.

Turning to radio 716, the radio 716 facilitates communication with a wireless telecommunications network. For example, radio 716 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 716 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1 ½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, another generation communication protocol, 802.11 protocols and techniques, a combination thereof, and so forth.

Illustrative wireless telecommunications technologies that radio 716 may facilitate include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for controlling cell site selection by a user device in a network for a telecommunications service, the system comprising:
    one or more antenna elements, associated with a cell site other than a macro cell, that support the telecommunications service for the user device; and
    one or more processors configured to execute operations comprising:
        transmitting a System Information Block (SIB) for receipt by the user device for cell site selection, the SIB transmission comprising information identifying a type of the cell site other than the macro cell; and
        upon selection of the cell site by the user device based on the SIB transmission comprising the information identifying the type of the cell site, providing access to the telecommunications service for the user device.

2. The system according to claim 1, wherein the type of the cell site is a femtocell, a picocell, or a micro cell.

3. The system according to claim 1, wherein the information identifying the type of the cell site includes a transmission power associated with the cell site.

4. The system according to claim 1, wherein the information identifies the type of the cell site as a small cell eNodeB or gNodeB.

5. The system according to claim 1, wherein the SIB is transmitted in response to receiving a registration request from the user device for setting up a Radio Resource Control connection.

6. The system according to claim 5, wherein the SIB is transmitted while the user device is camping on another serving cell other than the cell site.

7. The system according to claim 6, wherein the other serving cell is the macro cell.

8. The system according to claim 1, wherein the cell site provides a smaller coverage area than a coverage area of a neighboring cell site, the user device being within the coverage area of the neighboring cell site.

9. A method for controlling cell site selection by a user device in a network for a telecommunications service, the method comprising:
- transmitting, by a cell site other than a macro cell, a System Information Block (SIB) for receipt by the user device for cell site selection, the SIB transmission comprising information identifying a type of the cell site other than the macro cell; and
- upon selection of the cell site by the user device triggered by the SIB transmission comprising the information identifying the type of the cell site, providing the user device access, by the cell site other than the macro cell, to the telecommunications service.

10. The method of claim 9, wherein the SIB transmission is an SIB Type 1 message.

11. The method of claim 9, wherein the information of the SIB transmission identifies the type of the cell site as a 5G small cell.

12. The method of claim 9, wherein the SIB transmission further comprises user device priority information of the cell site for serving user devices via the telecommunications service.

13. The method of claim 9, wherein the SIB transmission is transmitted while the user device is in idle mode.

14. The method of claim 9, further comprising generating the SIB to include the type of the cell site and to include an antenna footprint associated with the cell site, wherein the user device is triggered to select the cell site based on the antenna footprint.

15. The method of claim 9, wherein the information identifies the type of the cell site as a small cell gNodeB.

16. The method of claim 9, further comprising:
- generating the SIB to include the type of the cell site;
- generating a second SIB for receipt by the user device for the cell site selection, the second SIB comprising information identifying a type of a neighboring cell site;
- transmitting the second SIB to the user device; and
- upon selection of the cell site instead of the neighboring cell site by the user device triggered by the type of the cell site having a smaller coverage area than the type of the neighboring cell site, providing the access to the telecommunications service for the user device.

17. The method of claim 16, further comprising generating the SIB to include an indication of a first transmission power of the cell site and generating the second SIB to include an indication of a second transmission power of the neighboring cell site, wherein the user device is triggered to select the cell site based on the first transmission power being lower than the second transmission power.

18. Computer-readable storage media having computer-executable instructions embodied thereon that, when executed by one or more processors, cause the one or more processors to perform operations for controlling cell site selection by a user device in a network for a telecommunications service, the operations comprising:
- causing the transmission, from a cell site, of a System Information Block (SIB) for receipt by the user device for cell site selection, the SIB transmission indicating that the cell site provides a smaller coverage area than the coverage area of a neighboring cell site; and
- upon selection of the cell site by the user device triggered by the SIB transmission indicating that the cell site provides the smaller coverage area, causing the cell site to provide the user device access to the telecommunications service.

19. The computer-readable storage media of claim 18, further comprising generating the SIB to include an indication that the cell site has a lower transmission power than the neighboring cell site, wherein the user device is triggered to select the cell site based on the indication that the cell site has the lower transmission power.

20. The computer-readable storage media of claim 18, further comprising generating the SIB to include an indication that the cell site has a smaller antenna structure than the neighboring cell site, wherein the user device is triggered to select the cell site based on the indication that the cell site has the smaller antenna structure.

* * * * *